United States Patent [19]
Kawasaki

[11] Patent Number: 5,544,141
[45] Date of Patent: Aug. 6, 1996

[54] CROSS-TALK CANCELER FOR OPTICAL DISK READING MECHANISM

[75] Inventor: Satoshi Kawasaki, Tokyo, Japan

[73] Assignee: NEC Corportion, Tokyo, Japan

[21] Appl. No.: 245,672

[22] Filed: May 18, 1994

[30] Foreign Application Priority Data

May 18, 1993 [JP] Japan .................................. 5-115106

[51] Int. Cl.[6] ..................................................... G11B 7/00
[52] U.S. Cl. ............... 369/060; 369/44.290; 369/44.320; 369/44.340; 369/44.360
[58] Field of Search ................................ 369/60, 47, 48, 369/49, 44.25, 44.29, 44.32, 44.34, 44.35, 44.36, 44.37, 44.41, 124

[56] References Cited

U.S. PATENT DOCUMENTS

| 4,750,162 | 6/1988 | Tajima .............................. 369/44.37 X |
| 5,168,487 | 12/1992 | Ohsato et al. ....................... 369/44.37 |
| 5,212,675 | 5/1993 | Yoshino et al. ................... 369/44.37 X |

FOREIGN PATENT DOCUMENTS

| 0393719 | 10/1990 | European Pat. Off. . |
| 64-49134 | 2/1989 | Japan . |
| 4-278231 | 10/1992 | Japan . |

OTHER PUBLICATIONS

Patent Abstracts of Japan vol. 13, No. 250, (P–882), abstract of Shigeru, "Optical Disk Recording And Reproducing Device", Japanese 1–049134, Aug. 19, 1987.

Patent Abstracts of Japan vol. 13, No. 162, (P–859), Apr. 19, 1989, abstract of Tadao et al., "Crosstalk Eliminating Circuit in Optical Reproducing Device", Japanese 64–001122, Jan. 5, 1989.

Katayama et al., "Multi–Beam Optical Disk Drive For High Data Transfer Rate Systems", *Japanese Journal of Applied Physics*, vol. 31:630–634, (1992).

Primary Examiner—Georgia Y. Epps
Assistant Examiner—Muhammad N. Edun
Attorney, Agent, or Firm—Foley & Lardner

[57] ABSTRACT

Reproduced signals from detectors 1a to 1c installed in an optical head are level-adjusted by amplifiers 2a to 2c. Output signals of the amplifiers 2a and 2b are delayed by respective delay circuits 6a and 6b. An output signal of the delay circuit 6b and an output signal of the amplifier 2c are subtracted from an output signal of the delay circuit 6a by an adder 4. A reproduced signal from which cross-talk resulting from the adjacent track has been removed is obtained from the adder 4. The delay amounts of the delay circuits 2a and 2b are set according to delay control signals 8a and 8b. The delay amounts are set when accessing to a fixed pattern recording area disposed on a predetermined position of the optical disk. A control circuit 5 measures a time difference between the output signal of the detector 1b and the output signal of the detector 1c to output a delay control signal 8a. The control circuit 5 measures a time difference between the output signal of the detector 1a and the output signal of the detector 1c to generate a delay control signal 8a.

1 Claim, 4 Drawing Sheets

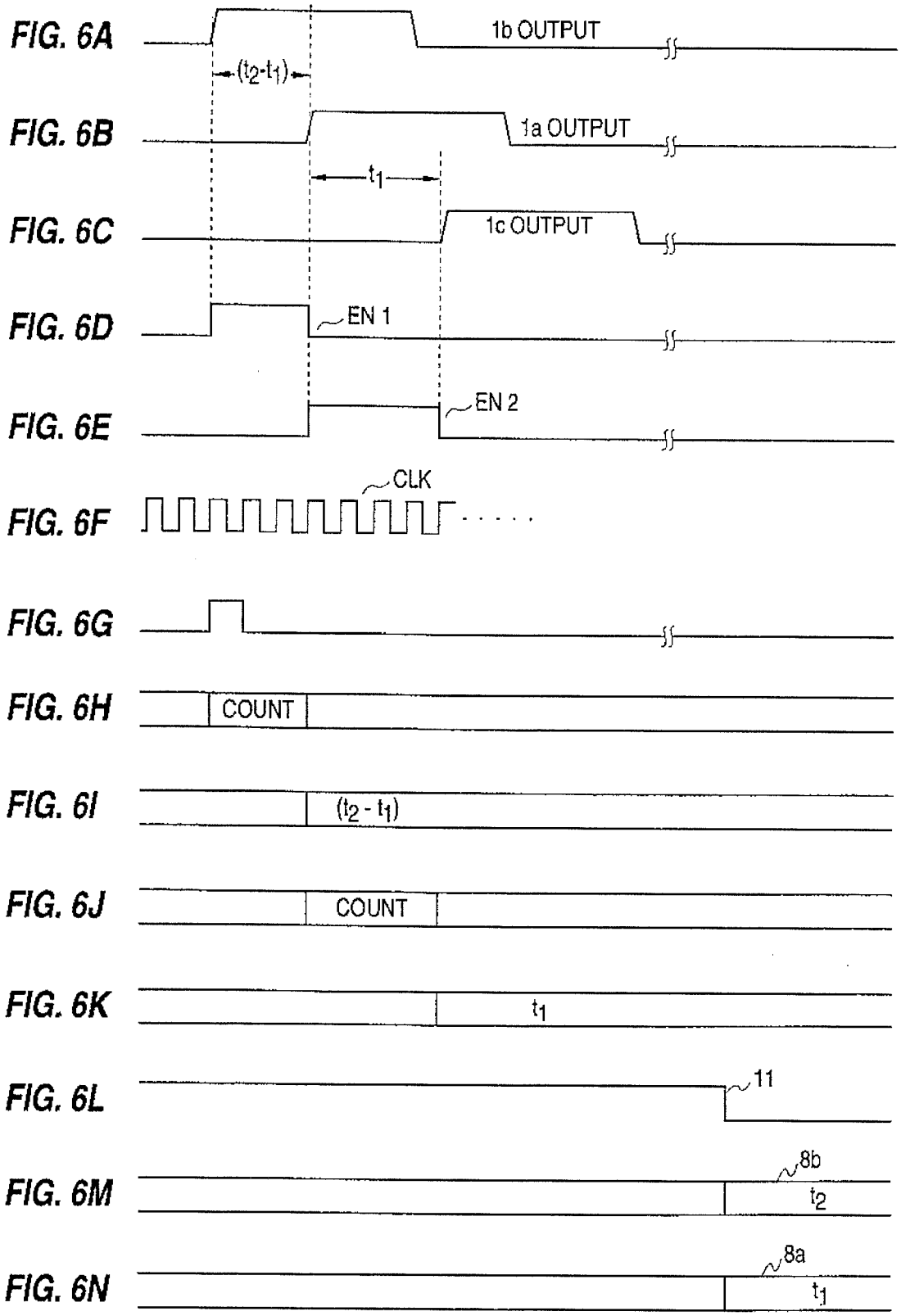

1

CROSS-TALK CANCELER FOR OPTICAL DISK READING MECHANISM

BACKGROUND OF THE INVENTION

The present invention relates to a cross-talk canceler, and more particularly to a cross-talk canceler used in a signal reproducing unit for an optical disk.

In order to improve a recording density of an optical disk medium, there is a tendency to narrow the distance between adjacent recording tracks on the medium. On the other hand, there is a limit to lessen a diameter of a read light beam. For that reason, if the distance between the recording tracks is made exceedingly short, the read optical beam is irradiated on a part of the adjacent track with the result that a signal which has been recorded on the adjacent track is mixed into a reproduced signal as a cross-talk component.

A cross-talk canceler has been used as the technique of removing the inter-track cross-talk. For example, Japanese Patent Unexamined Publication No. Sho 64-49134 (JP-A-49134/1989) discloses the technique in which the cross-talk is removed by use of three optical beam consisting of one main beam and two sub-beams. In this conventional technique, there are provided a main detector for receiving a reflected light of a main beam which has been irradiated on a desired track and two sub-detectors for receiving reflected lights of two sub-beams which have been irradiated on the tracks adjacent to the desired track, respectively. Then, the delayed and gain-adjusted signals output from the two sub-detectors are subtracted from the delayed signal output from the main detector to thereby reduce the inter-track cross-talk. The amount of delay to be added to the respective output signals of the main detector and one of the sub-detectors must be strictly adjusted in accordance with the respective distances of the beam spots on the optical disk and the rotational speed of the optical disk. Therefore, in the conventional technique, it is necessary to adjust the amount of delay for such detectors when manufacturing. Further, the respective distances of the main beam and the sub-beams are changed as a result of change in the passage of time of optical components within the optical head, whereby the optimum amount of delay is changed. Consequently, it is required to periodically readjust the amount of delay for the respective detectors.

SUMMARY OF THE INVENTION

An object of the present invention is to provide a cross-talk canceler for an optical disk reading mechanism which does not require the adjustment and/or readjustment of the above-mentioned amount of delay.

According to the present invention, there is provided a cross-talk canceler for use-in an optical disk reading mechanism for reading recorded information from an optical disk having at least three continuous tracks in which identical fixed patterns aligned in a radial direction thereof have been written to output a reproduced signal, said mechanism includes an optical head including a main detector, first and second sub-detectors for simultaneously reading the recorded information from the three tracks, said canceler comprising:

a first level adjusting circuit for giving a first gain to a main signal read from said main detector to output a gain-adjusted main signal;

a second level adjusting circuit for giving a second gain to a first auxiliary signal read from said first sub-detector to output a first gain-adjusted auxiliary signal;

a third level adjusting circuit for giving a third gain to a second auxiliary signal read from said second sub-detector to output a second gain-adjusted auxiliary signal;

a first delay circuit having a delay amount which is set according to a first delay control signal for delaying said first gain-adjusted auxiliary signal from said second level adjusting circuit to output a delayed auxiliary signal;

a second delay circuit having a delay amount which is set according to a second delay control signal for delaying said gain-adjusted main signal from said first level adjusting circuit;

a subtractor for subtracting said delayed auxiliary signal of said first delay circuit and said second gain-adjusted auxiliary signal of said third level adjusting circuit from said delayed main signal of said second delay circuit; and a control circuit which measures a time difference between said first auxiliary signal and a second auxiliary signal when said main detector, first and second sub-detectors read said fixed pattern to produce said first delay control signal, and measures a time difference between said main signal and said second auxiliary signal to generate said second delay control signal, for setting the delay amounts of said first and second delay circuits.

BRIEF DESCRIPTION OF THE DRAWINGS

The accompanying drawings, which are incorporated in and constitute a part of this specification, illustrate embodiments of the invention, and together with the description, serve to explain the objects, advantages and principles of the invention. In the drawings.

FIGS. 6A to 6N are timing charts used for explaining the operation of the control circuit 5.

DETAILED DESCRIPTION OF THE PREFERRED EMBODIMENTS

First, in order to facilitate understanding of the present invention, the conventional cross-talk canceler disclosed by the above-mentioned Japanese Patent Unexamined Publication No. Sho 64-49134 will be described with reference to FIGS. 1 and 2.

Figure 1:
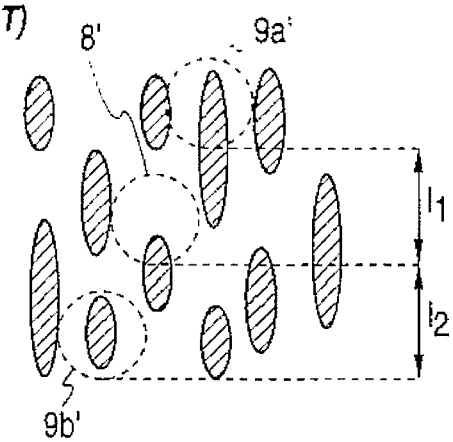
FIG. 1 is a diagram showing an arrangement of a main beam and two sub-beams on a surface of an optical disk.

FIG. 1 shows the positional relationship of a main beam 8' and two sub-beams 9a', 9b' with respect to respective track pits on an optical disk in an optical disk reading mechanism using the three-beam tracking system. As is apparent from the figure, as the track density on the optical disk becomes higher, irradiation of the respective light beams cannot be prevented from extending over the adjacent tracks, whereby a reproduced signal contains inter-track cross-talk.

Figure 2:
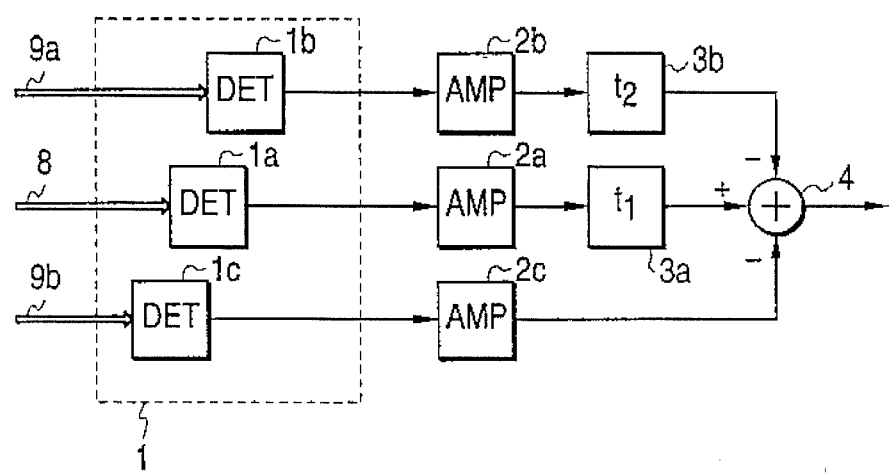
FIG. 2 is a block diagram showing a structural example of a conventional cross-talk canceler for an optical disk reading mechanism.

The conventional cross-talk canceler shown in FIG. 2 includes an optical head 1 including a photo detector 1a which receives a reflected light 8 obtained by irradiating the main beam 8' on a recording medium and photo detectors 1b and 1c which receive reflected lights 9a and 9b obtained by irradiating the sub-beams 9a' and 9b' on the recording medium, respectively; amplifiers 2a, 2b and 2c for amplifying output signals from the photo detectors 1a, 1b and 1c, respectively; a delay circuit 3b for delaying an output signal from the amplifier 2b by a delay time $t_2$; a delay circuit 3a for delaying an output signal from the amplifier 2a by a delay time $t_1$; and an adder 4 for subtracting an output signal of the delay signal 3b and an output signal of the amplifier 2c from an output signal of the delay circuit 3a.

The ratio of the gains of the amplifiers 2a, 2b and 2c is determined in accordance with an area of the adjacent track over which the main beam 8' extends. The delay time $t_1$ is determined by the following equation.

$$t_2 - t_1 = l_1/v, \ t_1 = l_2/v$$

where v is a rotational speed of the recording medium.

The ratio of the amplification degrees of the amplifiers 2a, 2b and 2c, and the delay times $t_1$ and $t_2$ are properly determined so as to restrain the cross-talk from the adjacent track contained in the reproduced signal (output signal of the adder 4).

As described above, in the conventional cross-talk canceler, it is necessary to properly adjust the delay times $t_1$ and $t_2$ when shipping. Moreover, it is necessary to periodically adjust the amount of delay in accordance with the aging change, for example, the change in the rotational speed of the recording medium. Furthermore, in order to appropriately adjust the delay times, a motor for rotating the recording medium must be selected from high-class motors the rotational speed of which has a reduced irregularity.

Now, a preferred embodiment of the present invention will be described with reference to FIG. 3.

The cross-talk canceler of this embodiment includes an optical head 1 to which a main beam reflected light 8 and sub-beam reflected lights 9a and 9b are incident light; amplifiers 2a, 2b and 2c for amplifying output signals from photo detectors 1a, 1b and 1c installed in the optical head 1, respectively; variable delay circuits 6a and 6b for delaying output signals from the amplifiers 2a and 2b in accordance with delay control signals 8a and 8b, respectively; an adder 4 for subtracting an output signal of the variable delay circuit 6b and an output signal of the amplifier 2c from an output signal of the variable delay circuit 6a; and a control circuit 5 which inputs the output signals of the detectors 1a, 1b and 1c for measuring delay times between the respective output signals to generate the delay control signals 8a and 8b. The cross-talk canceler of the invention also includes an oscillator 10 for supplying a clock signal (CLK) to the control circuit 5 and the variable delay circuits 6a and 6b, respectively.

Figure 4:
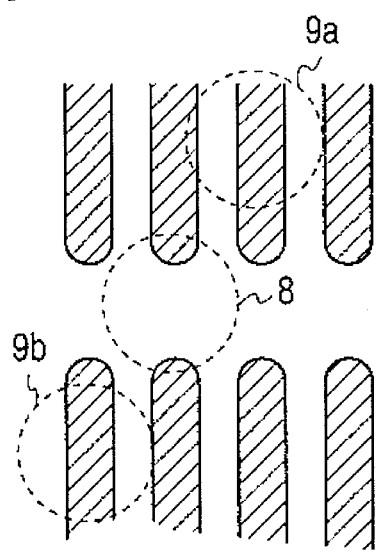
FIG. 4 is a diagram showing a part of a fixed pattern train written on the optical disk.

As shown in FIG. 4, this embodiment can be achieved provided that there is used an optical disk in which the same fixed pattern trains are recorded on at least three continuous tracks. The continuous tracks (hereinafter referred to as "reference tracks") on which the fixed pattern trains are written are preferably provided on the innermost side of the optical disk medium where the normal data is not recorded. The reference tracks are accessed when a power source for an optical disk drive unit equipped with the cross-talk canceler of the invention is turned on and then the rotation of the recording medium becomes in the stationary state. When a predetermined period of time is elapsed after this access, a latch pulse 11 is supplied to the control circuit 5 from a control section (not shown) of the optical disk drive unit so that the control circuit 5 outputs the delay control signals 8a and 8b. This operation will be described in more detail with reference to FIG. 6 later.

The information reproduced signal from the detectors 1a to 1c are gain-adjusted by the amplifiers 2a to 2c so as to eliminate the cross-talk component of the reproduced signal which has been subjected to addition process by the adder 4.

The control section (not shown) of the optical disk drive unit equipped with the cross-talk canceler of this embodiment allows the optical head 1 to be moved to a reference region when the rotation of the recording medium is stabilized after the power source of the device is turned on. As a result, the fixed pattern train read lights are incident lights to the detectors 1a, 1b and 1c, respectively. Upon elapse of a predetermined period of time after the read lights start to be incident to these detectors 1a, 1b and 1c, the amount of delay between the detectors 1c and 1b as well as the amount of delay between the detectors 1c and 1a is completely measured by the control circuit 5. When the latch pulse 11 is supplied to the control circuit 5 from the control section, the control circuit 5 supplies respective delay control signals to the variable delay circuits 6a and 6b.

The variable delay circuits 6a and 6b delay the output signals of the amplifiers 2a and 2b in response to the delay control signals 8a and 8b, respectively, and then supplies the delayed output signals to the adder 4. The adder 4 subtracts the output signal of the variable delay circuit 6b and the output signal of the amplifier 2c from the output signal of the variable delay circuit 6a to thereby generate a reproduced signal from which the inter-track cross-talk has been removed.

These delay control signals 8a and 8b are fixed until the power source for the optical disk drive unit is turned off. Therefore, in the embodiment of the present invention, every time the power source of the optical disk drive unit is turned on, the amount of delay for each of the variable delay circuits 6a and 6b is automatically set to an optimum value.

Subsequently, the structure and operation of the control circuit 5 will be described with reference to FIG. 5 and FIGS. 6A to 6N.

Figure 5:
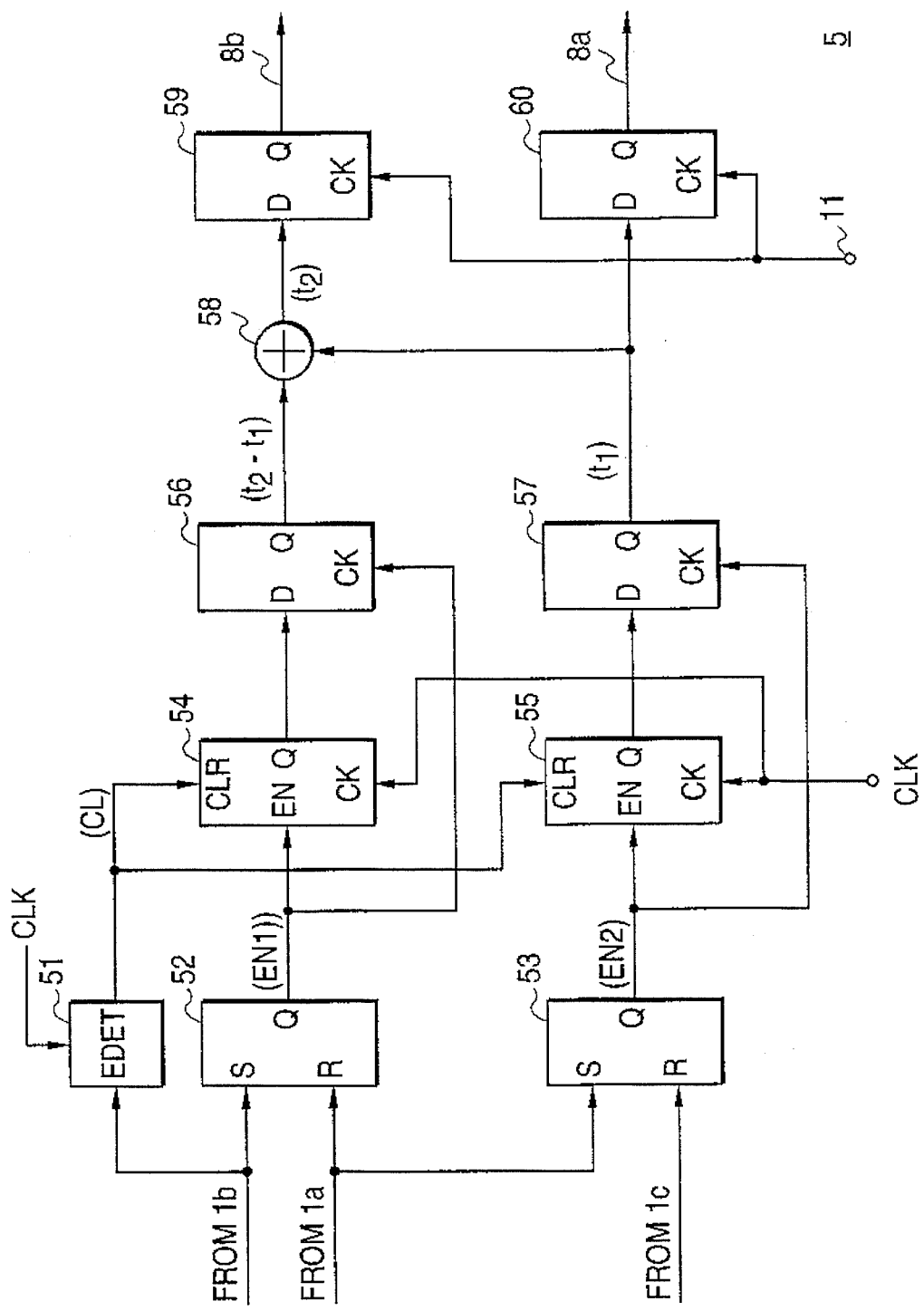
FIG. 5 is a block diagram showing the structure of a control circuit 5 in the cross-talk canceler of FIG. 3.

FIG. 5 is a block diagram showing the structure of the control circuit 5 whereas FIGS. 6A to 6N are timing charts used for explaining the operation thereof.

On the adjacent tracks of the reference region, the same fixed pattern data has been written, and therefore as shown in FIGS. 6A to 6C, the respective detectors 1b, 1a and 1c output the same signals with certain time differences. The time differences correspond to values $(t_2-t_1)$ and $t_1$ resulting from dividing the distances between the respective detectors 1a, 1b and 1c mounted on the optical head 1 by the rotational speed of the recording medium.

The output signals of the detectors 1b and 1a are supplied to a set (S) input terminal and a reset (R) input terminal of a set/reset flip flop (SR-FF) 52, respectively. As shown in FIG. 6D, the SR-FF 52 outputs a signal EN1 which has a high level at a rising edge of the output signal from the detector 1b and a low level at a rising edge of the output signal from the detector 1a. A period of time when the signal EN1 has the high level is represented by $(t_2-t_1)$. The signal EN1 is applied to an enable input terminal (EN) of a counter 54. A set input terminal of a SR-FF 53 is supplied with the output signal of the detector 1a whereas a reset input terminal thereof is supplied with the output signal of the detector 1c. As a result, the SR-FF 53 outputs a signal EN2 which has a high level only for the time $t_1$, as shown in FIG. 6E, and the signal EN2 is supplied to an enable input terminal of a counter 55.

On the other hand, the output signal of the detector 1b is also supplied to an edge detection circuit (EDET) 51, which outputs a signal (CL) representative of the rising edge of the output signal from the detector 1b on the basis of the clock signal (CLK) and the output signal of the detector 1b, as shown in FIG. 6G. The signal CL is supplied to clear input terminals (CLRs) of the counters 54 and 55 to thereby clear the count values of the counters 54 and 55.

The counter 54, as shown in FIG. 6H, counts the clock signals (CLKs) while the signal EN1 is at the high level. As a result, when the signal EN1 changes from the high level to the low level, the counter 54 outputs a signal corresponding to the time $(t_2-t_1)$. A D-type flip flop (D-FF) 56 samples this signal at the falling edge of the signal EN1, as shown in FIG. 6I. The counter 55 and the D-FF 57 operate likewise, and as shown in FIGS. 6J and 6K, the D-FF 57 outputs a value corresponding to the time $t_1$ to the D-FF 60.

The output signals of the D-FFs 56 and 57 are supplied to an adder 58, and the addition result of $((t_2-t_1)+t_1=t_2)$ is supplied to a D-FF 59.

The D-FFs 59 and 60 are supplied with the above-mentioned latch pulse from a terminal 11 (refer to FIG. 6L), and the latch pulse allows the input signals of the D-FFs 59 and 60 to be sampled and held. The D-FFs 59 and 60 output the delay control signals 8a and 8b, respectively.

Figure 3:
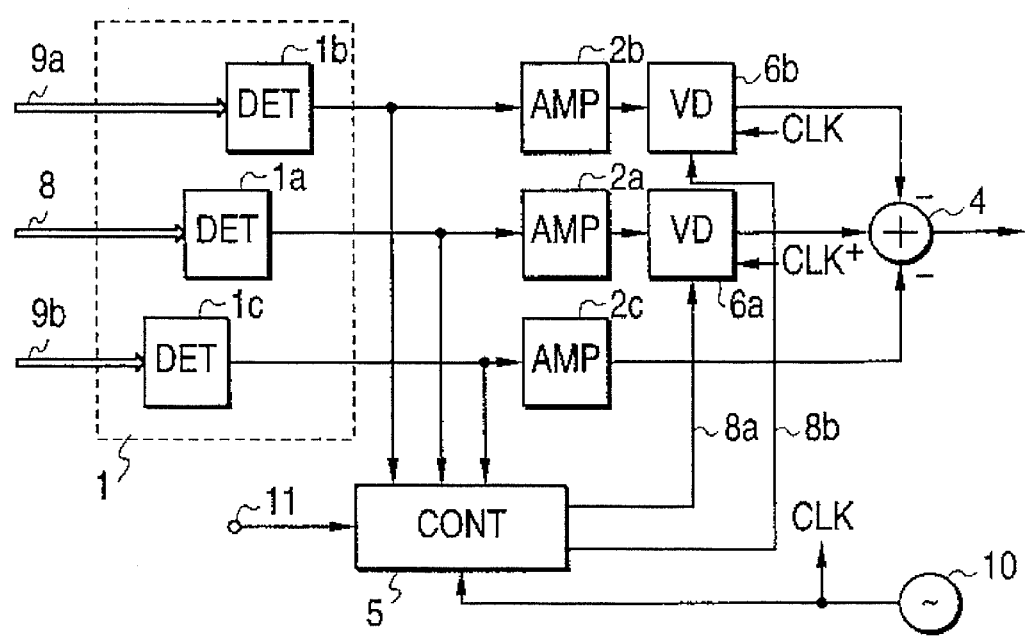
FIG. 3 is a block diagram showing a cross-talk canceler for an optical disk reading mechanism according to an embodiment of the present invention.

In the above-mentioned manner, the control circuit 5 supplies the delay control signals 8a and 8b to the variable delay circuits 6a and 6b shown in FIG. 3, respectively.

The exemplary structure and operation of the variable delay circuit 6a will be described with reference to FIG. 7. Since the variable delay circuit 6b is identical in structure with the variable delay circuit 6a, the description of the variable delay circuit 6b is omitted.

Figure 7:
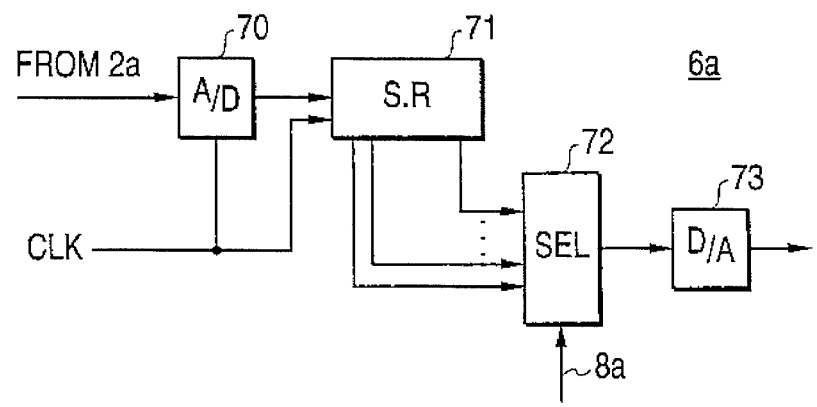
FIG. 7 is a block diagram showing a structural example of variable delay circuits in the cross-talk canceler of FIG. 3.

The structure shown in FIG. 7 can be applied as the variable delay circuit. In FIG. 7, an A/D converting circuit 70 converts the output signal of the amplifier 2a into a digital signal according to the clock signals (CLK), and the digital signal is then supplied to a shift register 71 with tap output terminals. The respective tap output signals of the shift register 71 are supplied to the selector 72. The respective tap output signals from the shift register 71 are the output signals of the amplifier 2a with different delay amount, and the selector 72 supplies the digital signal, to which a desired delay amount is added in accordance with the delay control signal 8a, to a D/A converter circuit 73. The D/A converter circuit 73 outputs an analog signal to which the delay amount specified by the delay control signal 8a has been added.

In the case of obtaining a reproduced signal in the form of a digital signal, no D/A converter circuit 73 is required.

In the case of applying an analog variable delay line as the variable delay circuit, the output signal of the adder 67 and the output signal of the latch circuit 66 may be digital-to-analog converted and then supplied to their analog variable delay lines as the delay control signals 8a and 8b in FIG. 6.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A cross-talk canceler for an optical disk reading mechanism for reading recorded information from an optical disk having at least three continuous tracks on which identical fixed patterns aligned in a radial direction thereof have been written to output a reproduced signal, said mechanism includes an optical head including a main detector, first and second sub-detectors for simultaneously reading the recorded information from three tracks, said canceler comprising:

a first level adjusting circuit for giving a first gain to a main signal read from said main detector to output a gain-adjusted main signal;

a second level adjusting circuit for giving a second gain to a first auxiliary signal read from said first sub-detector to output a first gain-adjusted auxiliary signal;

a third level adjusting circuit for giving a third gain to a second auxiliary signal read from said second sub-detector to output a second gain-adjusted auxiliary signal;

a first delay circuit having a delay amount which is set according to a first delay control signal for delaying said first gain-adjusted auxiliary signal from said second level adjusting circuit to output a delayed auxiliary signal;

a second delay circuit having a delay amount which is set according to a second delay control signal for delaying said gain-adjusted main signal from said first level adjusting circuit to output a delayed main signal;

a subtractor for subtracting said delayed auxiliary signal of said first delay circuit and said second gain-adjusted auxiliary signal of said third level adjusting circuit from said delayed main signal of said second delay circuit to output said reproduced signal;

a first measuring circuit for measuring a time difference between a rising time of said first auxiliary signal and a rising time of said second auxiliary signal to generate an output signal;

a second measuring circuit for measuring a time difference between said main signal and said second auxiliary signal to generate an output signal; and a holding circuit for holding the output signals of said first and second measuring circuits to generate said first and second delay control signals, wherein said second measuring circuit comprises:
a second flip flop which is set by said main signal and reset by said second auxiliary signal to output a second enable signal;
a second counter for counting clock signals while said second enabling signal is at a high level; and a second sampling means for sampling the output signal of said second counter to supply a sampled signal to said holding circuit as the output signal of said second measuring circuit at the time of a falling edge of said second enabling signal, wherein said first measuring circuit comprises:
 a first flip flop which is set by said first auxiliary signal and reset by said main signal to output a first enable signal;
 a first counter for counting said clock signals while said first enabling signal is at a high level;
 a first sampling means for sampling the output signal of said first counter at the time of a falling edge of said first enable signal; and
 an adder for adding an output signal of said first sampling means and an output signal of said second sampling means to supply the output signal of said first measuring circuit to said holding circuit, and wherein said canceler further includes a circuit for detecting a rising edge of said first auxiliary signal to clear said first and second counters.

* * * * *